United States Patent
Ou et al.

(10) Patent No.: US 9,466,940 B2
(45) Date of Patent: Oct. 11, 2016

(54) GRAPHENE ILLUMINATOR, AND HEAT DISSIPATING APPARATUS AND OPTICAL TRANSMISSION NETWORK NODE USING THE GRAPHENE ILLUMINATOR

(71) Applicant: HUAWEI TECHNOLOGIES CO., LTD., Shenzhen, Guangdong (CN)

(72) Inventors: Jian Ou, Shenzhen (CN); Peiyi Xiao, Shenzhen (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

(21) Appl. No.: 14/535,043

(22) Filed: Nov. 6, 2014

(65) Prior Publication Data

US 2015/0063379 A1 Mar. 5, 2015

Related U.S. Application Data

(63) Continuation of application No. PCT/CN2013/080206, filed on Jul. 26, 2013.

(30) Foreign Application Priority Data

Jul. 26, 2012 (CN) .......................... 2012 1 0261388

(51) Int. Cl.
*H01S 3/09* (2006.01)
*H01S 3/04* (2006.01)
*H01S 3/16* (2006.01)

(52) U.S. Cl.
CPC ........... *H01S 3/0903* (2013.01); *H01S 3/0405* (2013.01); *H01S 3/1628* (2013.01)

(58) Field of Classification Search
CPC ... H01S 3/0405; H01S 3/0903; H01S 3/1628
See application file for complete search history.

(56) References Cited

U.S. PATENT DOCUMENTS 4,779,277 A * 10/1988 Gover .................. H01S 3/0903
372/2
5,020,061 A 5/1991 Etievant et al.
(Continued)

FOREIGN PATENT DOCUMENTS

CN 101944990 A 1/2011
CN 102047428 A 5/2011
(Continued)

OTHER PUBLICATIONS

Leonhard Prechtel et al:"Time-resolved ultrafast photocurrents and terahertz generation in freely suspended graphene", XP055196564, Jan. 31, 2012, total 8 pages.
(Continued)

*Primary Examiner* — Xinning Niu
(74) *Attorney, Agent, or Firm* — Huawei Technologies Co., Ltd.

(57) ABSTRACT

A graphene illuminator includes two electrodes, an accelerating electric field power supply, and several magnet sets, and further includes a graphene material used for providing free-electrons. The two electrodes are respectively disposed on both sides or at both ends of the graphene material, and meanwhile are both disposed on a plane where the graphene material is disposed; a positive electrode and a negative electrode of the accelerating electric field power supply are respectively connected to the two electrodes, to apply, in a first direction, an accelerating electric field to the graphene material; and the magnet sets are disposed on upper and lower sides of the plane where the graphene material is disposed, to generate a magnetic field perpendicular to the plane where the graphene material is disposed, and South poles and North poles of the magnet sets are arranged alternately to generate an alternating magnetic field in a second direction.

9 Claims, 3 Drawing Sheets

(56) References Cited

U.S. PATENT DOCUMENTS

| | | | |
|---|---|---|---|
| 5,144,193 A | 9/1992 | Warren | |
| 5,956,353 A | 9/1999 | Nguyen et al. | |
| 7,876,793 B2 | 1/2011 | Gorrell et al. | |
| 2002/0024978 A1* | 2/2002 | Inagaki | H01S 3/10092 372/20 |
| 2011/0042712 A1 | 2/2011 | Wang | |
| 2012/0068152 A1 | 3/2012 | Hwang et al. | |
| 2012/0119837 A1* | 5/2012 | Blick | H01Q 1/2283 331/74 |
| 2012/0314726 A1 | 12/2012 | Lee et al. | |

FOREIGN PATENT DOCUMENTS

| | | |
|---|---|---|
| CN | 102290704 A | 12/2011 |
| CN | 102403430 A | 4/2012 |
| CN | 102801101 A | 11/2012 |
| DE | 2556464 B1 | 2/1977 |
| JP | 0360178 A | 3/1991 |
| JP | 11133471 A | 5/1999 |
| JP | 2011519151 A | 6/2011 |
| KR | 101097175 B1 | 12/2011 |
| WO | 2009111832 A1 | 9/2009 |
| WO | 2011078467 A2 | 6/2011 |

OTHER PUBLICATIONS

Takahiro Morimoto et.al: "Cyclotron radiation and emission in graphene", Physical Review B, vol. 78, 2008, total 4 pages.

D.A.G. Deacon, et.al., First Operation of a Free-Electron Laser, Physical Review Letters, vol. 38, No. 16, Apr. 18, 1977, pp. 892-894.

* cited by examiner

US 9,466,940 B2

GRAPHENE ILLUMINATOR, AND HEAT DISSIPATING APPARATUS AND OPTICAL TRANSMISSION NETWORK NODE USING THE GRAPHENE ILLUMINATOR

CROSS-REFERENCE TO RELATED APPLICATIONS

This application is a continuation of International Application No. PCT/CN2013/080206, filed on Jul. 26, 2013, which claims priority to Chinese Patent Application No. 201210261388.1, filed on Jul. 26, 2012, both of which are hereby incorporated by reference in their entireties.

TECHNICAL FIELD

The present invention relates to the material field, and in particular, to a new application of a graphene material.

BACKGROUND

There are various types of lasers, but in terms of excitation manners, there are mainly three types of lasers: a stimulated emission laser, a free-electron laser, and a chemical laser. Currently, lasers widely used in the industry are mainly stimulated emission lasers, which are classified into a solid-state laser, a gas laser, a liquid laser, a semiconductor laser, and the like according to difference of states of a working substance. A main characteristic of these lasers such that a laser wavelength is related to an excitation substance; and if the excitation substance is determined, the laser wavelength is determined accordingly.

A free-electron laser is a special type of new lasers. Its working substance is a directional free-electron beam which moves at a high speed in a magnetic field with a periodic space change. Tunable coherent electromagnetic radiation can be produced merely by changing a speed of the free-electron beam. In principle, coherent radiation spectrum can transit from an X-ray waveband to a microwave region, and a wavelength range of the electromagnetic radiation is adjustable. Therefore, the free-electron laser has a very promising prospect, and more implementation manners are needed, so that in a practical application, an appropriate selection can be made according to advantages and disadvantages of the various manners.

SUMMARY

Embodiments of the present invention provide a graphene illuminator for producing a free-electron laser, and a heat dissipating apparatus and a network node using the graphene illuminator.

According to one aspect, an embodiment of the present invention provides a graphene illuminator which includes two electrodes, an accelerating electric field power supply, and several magnet sets, and further includes a graphene material used for providing free-electrons, where the two electrodes are respectively disposed on both sides or at both ends of the graphene material, and meanwhile are both disposed on a plane where the graphene material is disposed; a positive electrode and a negative electrode of the accelerating electric field power supply are respectively connected to the two electrodes, to apply, in a first direction, an accelerating electric field to the graphene material; and the magnet sets are disposed on upper and lower sides of the plane where the graphene material is disposed, to generate a magnetic field perpendicular to the plane where the graphene material is disposed, and South poles and North poles of the magnet sets are arranged alternately to generate an alternating magnetic field in a second direction, where the second direction is perpendicular to both the first direction and the plane where the graphene material is disposed, so that the free-electrons of the graphene material can perform a curvilinear motion under action of the accelerating electric field and the alternating magnetic field and are excited to generate photons.

The foregoing graphene illuminator serves as a new laser light source by using the graphene material as a free-electron source, and generating photons under the action of the accelerating electric field and the alternating magnetic field. By adjusting any one of such parameters as voltage of the accelerating electric field power supply, alternating magnetic field intensity, wavy magnetic field spacing, and graphene temperature, wavelength adjustment of an output laser can be implemented, thereby meeting a light source requirement for a laser device.

According to another aspect, an embodiment of the present invention provides a heat dissipating apparatus which includes two electrodes, an accelerating electric field power supply, several magnet sets, and a graphene material used for providing free-electrons, where the two electrodes are respectively disposed on both sides or at both ends of the graphene material, and meanwhile are both disposed on a plane where the graphene material is disposed; a positive electrode and a negative electrode of the accelerating electric field power supply are respectively connected to the two electrodes, to apply, in a first direction, an accelerating electric field to the graphene material; the graphene material is in contact with a heating element to absorb heat of the heating element and increase kinetic energy of the free-electrons; and the magnet sets are respectively disposed on upper and lower sides of the plane where the graphene material is disposed, to generate a magnetic field perpendicular to the plane where the graphene material is disposed, and South poles and North poles of the magnet sets are arranged alternately, so as to produce an alternating magnetic field in a second direction, where the second direction is perpendicular to both the first direction and the plane where the graphene material is disposed, so that the free-electrons of the graphene material can perform a curvilinear motion under action of the accelerating electric field and the alternating magnetic field and are excited to generate photons, so as to dissipate heat.

After the graphene material absorbs heat of the heating element, vibrations and energy of free-electrons on the graphene material increase; and then the free-electrons, under the action of the accelerating electric field and the alternating magnetic field, jump from a higher energy level to a low energy level at one stroke, and excite high-frequency photons, so that the heat energy absorbed by the graphene material is converted into light energy and dissipated. That is, a frequency of the high-frequency photons is higher than that of the photons excited by the free-electrons of the graphene material under the action of the accelerating electric field and the alternating magnetic field in a case that no heat is absorbed.

According to still another aspect, an embodiment of the present invention provides an optical transmission network node which includes a graphene illuminator and reflecting mirror sets for modulating an optical transmission signal, where the graphene illuminator includes a graphene material used for providing free-electrons, two electrodes, an accelerating electric field power supply, and several magnet sets, where the two electrodes are respectively disposed on both sides or at both ends of the graphene material, and meanwhile are both disposed on a plane where the graphene material is disposed; a positive electrode and a negative electrode of the accelerating electric field power supply are respectively connected to the two electrodes, to apply, in a first direction, an accelerating electric field to the graphene material; and the magnet sets are disposed on upper and lower sides of the plane where the graphene material is disposed, to generate a magnetic field perpendicular to the plane where the graphene material is disposed, and South poles and North poles of the magnet sets are arranged alternately to generate an alternating magnetic field in a second direction, so that the free-electrons of the graphene material can perform a curvilinear motion under action of the accelerating electric field and the alternating magnetic field and are excited to generate photons, where the second direction is perpendicular to both the first direction and the plane where the graphene material is disposed; and the reflecting mirror sets include a first reflecting mirror set disposed along an emergent light direction of a movement of the free-electrons and a second reflecting mirror set disposed opposite to the first reflecting mirror set, where a portion of the photons excited by the free-electrons pass along the emergent light direction, the other part of the photons are reflected back by the first reflecting mirror set, and the second reflecting mirror set reflects back the photons in a direction opposite to the emergent light direction, thereby converging the photons excited by the free-electrons in a single direction.

By using the reflecting mirror sets, the optical transmission network node converges the photons excited by the graphene illuminator into a laser beam that can be used to modulate an optical signal, so as to implement transmission of an optical network signal by modulating the laser beam.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person skilled in the art based on the embodiments of the present invention shall fall within the protection scope of the present invention.

Embodiments of the present invention provide a graphene illuminator, and a heat dissipating apparatus and a network node using the graphene illuminator. By use of characteristics of free-electrons on a surface of a graphene material, a specific environment is set to excite free-electrons on the graphene material to generate photons so that the graphene illuminator can serve as a light source of a free-electron laser, thereby improving performance of the laser.

Embodiment 1

Figure 1:
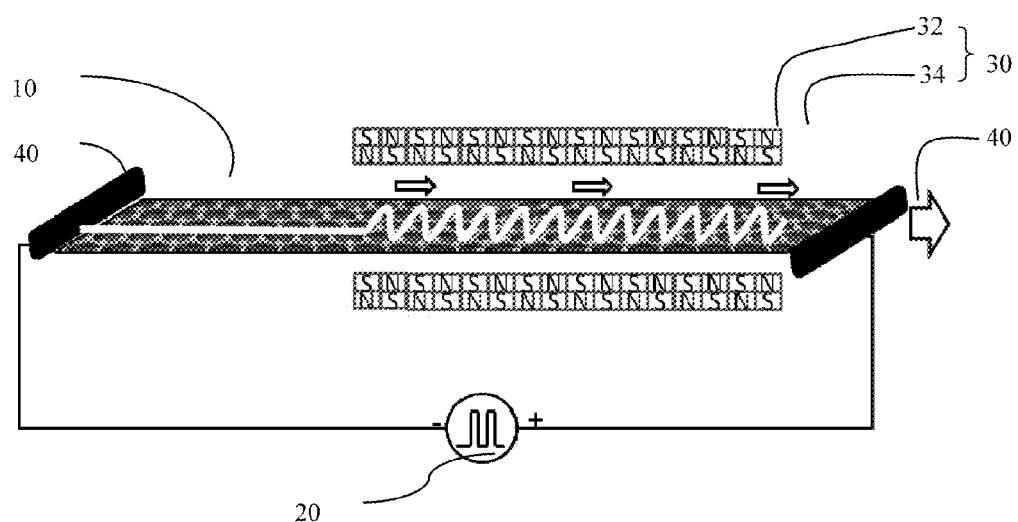
FIG. 1 is a graphene illuminator according to Embodiment 1 of the present invention.

As shown in FIG. 1, a graphene illuminator according to Embodiment 1 of the present invention includes a graphene material 10, an accelerating electric field power supply 20, and several magnet sets 30.

In this embodiment, the graphene material 10 is a sheet formed by one or more layers of graphene sheets, where free-electrons that can move at a high speed exist on each layer of the graphene sheet between the graphene sheets. The pure graphene material 10 is a semi-metal or zero-band gap semiconductor. In its electronic structure, for low-energy electrons near six corners in a formed two-dimensional hexagonal Brillouin zone shown in FIG. 1, an energy-momentum relationship is a linear relationship: $E=hv_F k=hv_F\sqrt{k_x^2+k_y^2}$, where E is energy, h is a reduced Planck constant, $v_F \approx 10^6$ is a Fermi velocity, and $k_x$ and $k_y$ are respectively an X-axis component and a y-axis component of a wave vector; and effective mass (effective mass) for electrons and holes is equal to zero. Due to the linear dispersion relationship, physical behaviors of the electrons and holes near the six points are like those of relativistic spin-1/2 particles described by the Dirac equation. Therefore, the electrons and holes of graphene are called Dirac fermions, and the six corners of the Brillouin zone are called "Dirac points" or "neutral points". At room temperature, graphene has surprisingly high electron mobility (electron mobility) with a value exceeding 15,000 $cm^2V^{-1}s^{-1}$, where the mobility of the holes and the electrons should be equal. Due to the foregoing two-dimensional property of the graphene material 10, the graphene material 10 becomes an efficient free-electron source of an illuminator in a specific scenario set in the present invention.

The accelerating electric field power supply is configured to apply, in a first direction of the graphene material 10, an accelerating electric field on the graphene material 10, to maximize use efficiency of the graphene material 10. The first direction is preferably consistent with a longitudinal direction of the sheet-like graphite material. The accelerating electric field may be an alternating electric field or a pulsed electric field.

The foregoing graphene illuminator further includes two electrodes 40, where the two electrodes 40 are electrically connected to a positive electrode and a negative electrode of the accelerating electric field power supply 20, and the two electrodes 40 are electrically connected to both ends or both sides of the graphene material 10, or the two electrodes 40 are disposed on both sides or at both ends of the graphene material 10, and meanwhile are both disposed on a plane where the graphene material is disposed, to apply the accelerating electric field in the first direction. The graphene material 10 includes a rectangular or strip-shaped graphene sheet, and that the two electrodes 40 are respectively disposed on both sides or at both ends of the graphene material 10 means that the two electrodes 40 are respectively disposed on both sides of the rectangular graphene sheet or at both ends of the strip-shaped graphene sheet. The graphene material 10 includes a circular or annular graphene sheet, and that the two electrodes 40 are respectively disposed on both sides or at both ends of the graphene material 10 means that one electrode 40 is disposed at a center of the circular or annular graphene sheet, and the other electrode 40 is disposed at the periphery or circumference of the circular or annular graphene sheet.

The foregoing several magnet sets 30 are disposed on opposite sides of the plane where the graphene material 10 is disposed. For example, as shown in FIG. 1, the magnet sets 30 are disposed on upper and lower sides of the plane where the graphene material 10 is disposed. The first direction is parallel to the plane where the graphene material 10 is disposed, or the first direction is on the plane where the graphene material 10 is disposed. The magnet sets 30 on the upper and lower sides are perpendicular to the plane where graphene material 10 is disposed, and face each other. Each magnet set 30 includes two parts: an North pole and an South pole, where the South pole and the North pole are placed perpendicular to the plane where the graphene material 10 is disposed. According to different placement manners, the magnet sets 30 may be divided into first magnet sets 32 and second magnet sets 34, where the first magnet sets 32 are arranged from the South pole to the North pole in a direction perpendicular to the plane where the graphene material 10 is disposed, and arrangement of the two poles of the second magnet sets 34 is opposite to that of the first magnet sets 32, that is, the second magnet sets 34 are arranged from the North pole to the South pole in a direction perpendicular to the plane where the graphene material 10 is disposed.

The magnet sets 30 on the upper and lower sides of the graphene material 10 are formed by the first magnet sets 32 and the second magnet sets 34 arranged alternately, so as to form an alternating magnetic field in a second direction perpendicular to the plane where the graphene material 10 is disposed, that is, one second magnet set 34 is disposed between every two adjacent first magnet sets 32, and likewise, one first magnet set 32 is disposed between every two adjacent second magnet sets 34. The second direction is perpendicular to the plane where the graphene material 10 is disposed, and meanwhile also perpendicular to the first direction of the accelerating electric field, that is, the alternating magnetic field is perpendicular to the accelerating electric field. The magnet sets 30 on the upper and lower sides of the graphene material 10 are disposed one by one facing each other, that is, if the first magnet set 30 on one side of the graphene material 10 is a first magnet set 32, the magnet set which faces the first magnet set 30 on one side of the graphene material 10 and is on the other side of the graphene material 10 is also a first magnet set 32. Additionally, all magnets are consistent in size, thereby forming an evenly alternating magnetic field.

Figure 3:
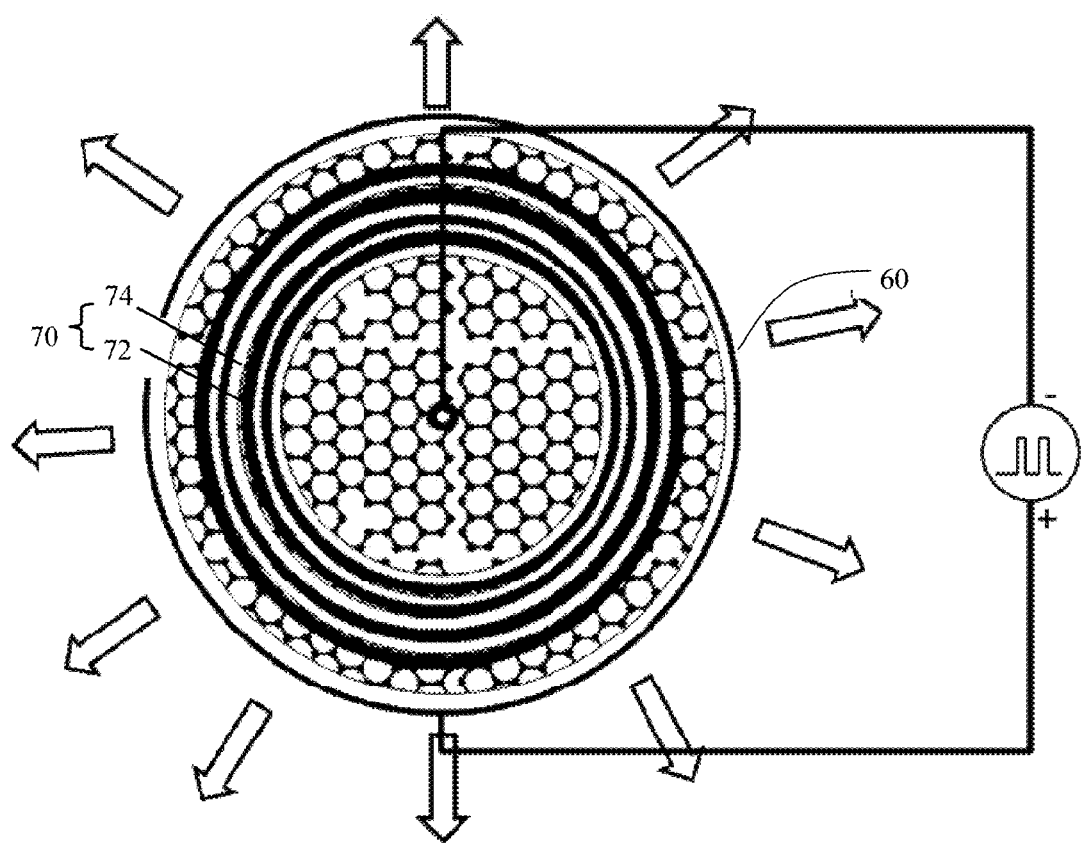
FIG. 3 is another arrangement manner of magnet sets of a graphene illuminator according to Embodiment 1 of the present invention.
Figure 4:
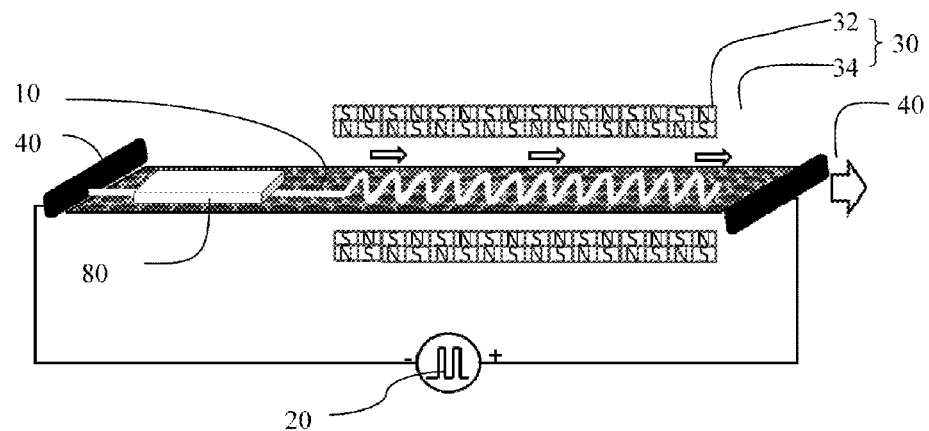
FIG. 4 is a heat dissipating apparatus according to Embodiment 2 of the present invention.

When the graphene material 10 is a rectangular or strip-shaped sheet, the magnet sets 30 are tetragonal and formed by the first magnet sets 32 and the second magnet sets 34 which are arranged closely and alternately. As shown in FIG. 3, in this embodiment of the present invention, when the graphene material 60 includes a circular or annular graphene sheet, a magnet sets 70 are annular and formed by first magnet sets 72 and second magnet sets 74 which are arranged closely and alternately from outward towards a center, and correspondingly, a magnet set 70 closer to the center has a smaller size.

Figure 2:
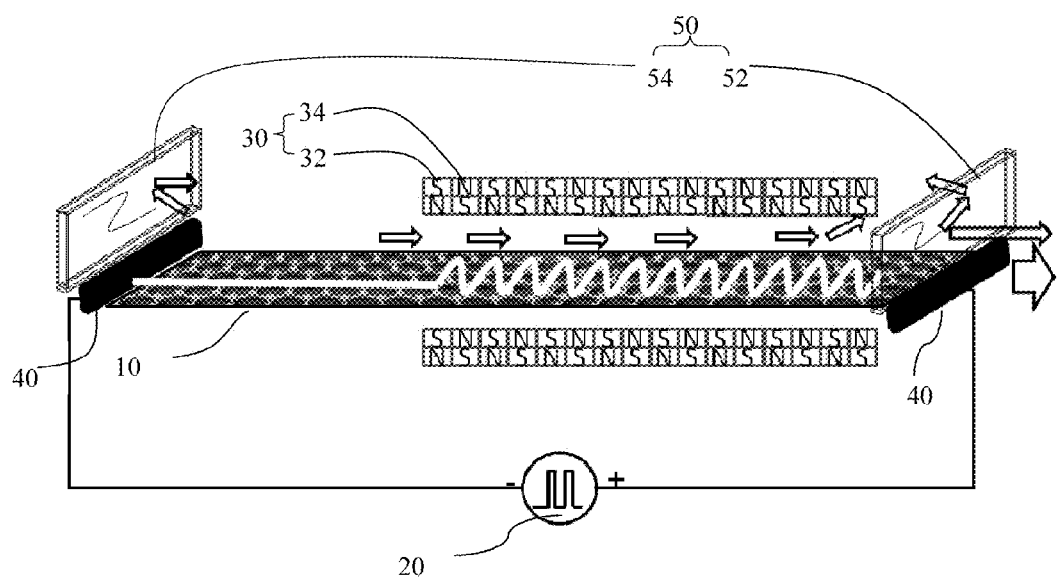
FIG. 2 is a graphene illuminator according to Embodiment 1 of the present invention.

As shown in working schematic diagrams of the graphene illuminator in FIG. 1 to FIG. 3 in the embodiment of the present invention, during a practical application, the graphene illuminator applies, by using the accelerating electric field power supply 20, accelerating voltage to the electrodes 40 on both sides of the graphene material 10, to form, in the first direction, the accelerating electric field covering the graphene material 10. For example, under the action of the accelerating electric field in the first direction, free-electrons on the graphene material 10 move, along the first direction, from the electrode 40 which is connected to the negative electrode of the accelerating electric field power supply 20 to the electrode 40 which is connected to the positive electrode of the accelerating electric field power supply 20. In a moving process of the free-electrons from the electrode 40 connected to the negative electrode to the electrode 40 connected to the positive electrode, according to Ampere's left-hand rule, because under the action of the alternating magnetic field, electrons are subject to Lorentz force perpendicular to the magnetic field and electric field directions, and because the magnetic field direction of the alternating magnetic field is alternately reversed, a magnetic force applied to the free-electrons is on the plane where the graphene material 10 is disposed, perpendicular to the accelerating electric field, and alternately reversed in the direction of the alternating magnetic field. Therefore, the free-electrons of the graphene material 10 perform a curvilinear motion under the action of the accelerating electric field and the alternating magnetic field, where the curve is a sine curve.

Photons are excited to form a light source on a condition that free-electrons are made to satisfy the following equations (1) and (2) by means of adjustment of magnetic field and electric field intensities:

$$W = E_{kin} + m_e c^2 \quad (1)$$

$$\gamma = W/(m_e c^2) \quad (2)$$

where, $E_{kin}$ is kinetic energy of electrons, which is the kinetic energy provided by the accelerating electric field for the electrons, c is a light speed in vacuum, $\gamma$ is a normalized electron velocity, W is kinetic energy, and me is electron mass.

Moreover, a wavelength of the excited photons is determined by the following equations (3) and (4):

$$\lambda_l = \frac{\lambda_u}{2\gamma^2}\left(1 + \frac{K^2}{2}\right) \quad (3)$$

$$K = \frac{eB_0\lambda_u}{2\pi m_e c} \quad (4)$$

where, $\lambda_l$ is a laser wavelength, $\lambda_\mu$ is center spacing of adjacent magnetic poles of a wavy magnetic field, and $B_0$ is peak intensity of a wavy magnetic field. Therefore, by adjusting any parameter of the voltage of the accelerating electric field power supply 20, alternating magnetic field intensity, wavy magnetic field spacing, and graphene temperature, wavelength adjustment of an output laser can be implemented, thereby meeting a light source requirement for a laser device.

As shown in FIG. 2, the graphene illuminator further includes reflecting mirror sets 50, where the reflecting mirror sets 50 include a first reflecting mirror set 52 above one electrode 40 and a second reflecting mirror set 54 above the other electrode and opposite to the first reflecting mirror set 52, where a portion of photons excited by the free-electrons are emitted through the first reflecting mirror set 52, the other part of the free-electrons are reflected back by the first reflecting mirror set 52, and the second reflecting mirror set 54 reflects back the photons hitting on it towards the first reflecting mirror set 52, thereby converging the photons excited by the free-electrons in a single direction. The first reflecting mirror set 52 has a filtering function, that is, among the photons which hit on the first reflecting mirror set 52, only the photons with a specific wavelength can be transmitted out, so that the photons with a single wavelength among the photons excited by the free-electrons are converged into a laser beam through the reflecting mirror sets 50.

Embodiment 2

As shown in FIG. 3, an embodiment of the present invention further provides a heat dissipating apparatus using the graphene illuminator to dissipate heat. The heat dissipating apparatus includes two electrodes 40, an accelerating electric field power supply 20, several magnet sets 30, and a graphene material 10 used for providing free-electrons, where the two electrodes 40 are respectively disposed on both sides or at both ends of the graphene material 10, and meanwhile are both disposed on a plane where the graphene material 10 is disposed; a positive electrode and a negative electrode of the accelerating electric field power supply 20 are respectively connected to the two electrodes 40, to apply, in a first direction, an accelerating electric field to the graphene material 10; the graphene material 10 is in contact with a heating element to absorb heat of the heating element and increase kinetic energy of the free-electrons; and the magnet sets 30 are disposed on upper and lower sides of the plane where the graphene material 10 is disposed, to generate a magnetic field perpendicular to the plane where the graphene material 10 is disposed, and South poles and North poles of the magnet sets 30 are arranged alternately to generate an alternating magnetic field in a second direction, where the second direction is perpendicular to both the first direction and the plane where the graphene material 10 is disposed, so that the free-electrons of the graphene material 10 can perform a curvilinear motion under action of the accelerating electric field and the alternating magnetic field and are excited to generate photons, so as to dissipate heat.

The graphene material 10 includes a rectangular or strip-shaped graphene sheet. That the graphene material 10 is in contact with a heating element means that one end of the graphene material 10 which is close to the electrode connected to the negative electrode of the accelerating electric field power supply 20 is in contact with the heating element. Alternatively, the graphene material 10 includes a circular or annular graphene sheet. That the graphene material 10 is in contact with a heating element means that a center or a center peripheral region of the circular or annular graphene sheet is in contact with the heating element, where the electrode connected to the negative electrode of the accelerating electric field power supply 20 is disposed at the center of the circular or annular graphene sheet.

After the graphene material 10 absorbs heat of the heating element, vibrations and energy of free-electrons on the graphene material 10 increase, and then the free-electrons, under the action of the accelerating electric field and the alternating magnetic field, jump from a higher energy level to a low energy level at one stroke, and excite high-frequency photons, so that the heat energy absorbed by the graphene material 10 is converted into light energy and dissipated. That is, a frequency of the high-frequency photons is higher than that of the photons excited by the free-electrons of the graphene material 10 under the action of the accelerating electric field and the alternating magnetic field in a case that no heat is absorbed.

Embodiment 3

Figure 5:
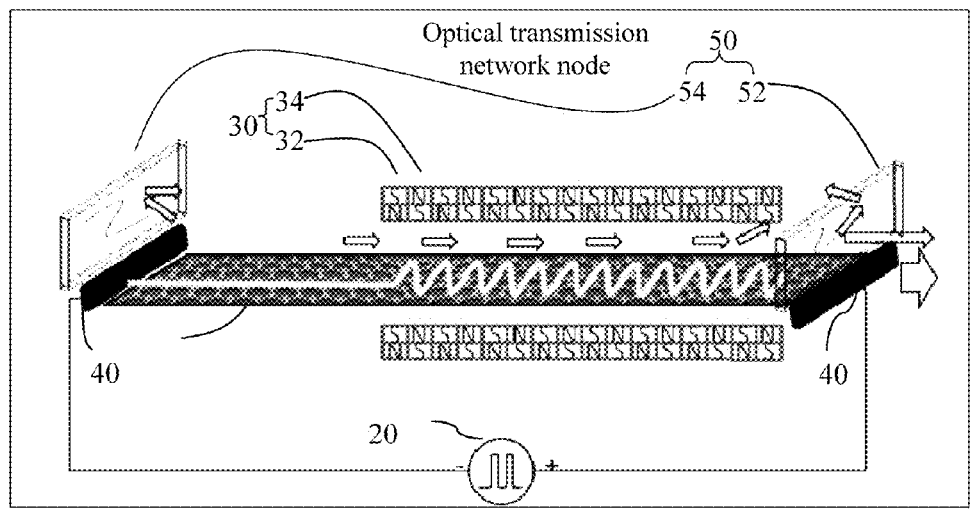
FIG. 5 is an optical transmission network node according to Embodiment 3 of the present invention.

As shown in FIG. 5, an embodiment of the present invention further provides an optical transmission network node, which includes a graphene illuminator and reflecting mirror sets 50 for modulating an optical transmission signal. The graphene illuminator includes a graphene material 10 used for providing free-electrons, two electrodes 40, an accelerating electric field power supply 20, and several magnet sets 30, where the two electrodes 40 are respectively disposed on both sides or at both ends of the graphene material 10, and meanwhile are both disposed on a plane where the graphene material 10 is disposed; a positive electrode and a negative electrode of the accelerating electric field power supply 20 are respectively connected to the two electrodes 40, to apply, in a first direction, an accelerating electric field to the graphene material 10; and the magnet sets 30 are disposed on upper and lower sides of the plane where the graphene material 10 is disposed, to generate a magnetic field perpendicular to the plane where the graphene material 10 is disposed, and South poles and North poles of the magnet sets 30 are arranged alternately to generate an alternating magnetic field in a second direction, so that the free-electrons of the graphene material 10 can perform a curvilinear motion under action of the accelerating electric field and the alternating magnetic field and are excited to generate photons, where the second direction is perpendicular to both the first direction and the plane where the graphene material 10 is disposed. The reflecting mirror sets 50 include a first reflecting mirror set 52 disposed along an emergent light direction of a movement of the free-electrons and a second reflecting mirror set 54 opposite to the first reflecting mirror set 52, where a portion of the photons excited by the free-electrons pass along the emergent light direction, the other part of the free-electrons are reflected back by the first reflecting mirror set 52, and the second reflecting mirror set 54 reflects back the photons in a direction opposite to the emergent light direction, thereby converging the photons excited by the free-electrons in a single direction.

The foregoing optical transmission network node converges, by using the reflecting mirror sets, photons excited by the graphene illuminator into a laser beam that can be used to modulate an optical signal, so as to implement transmission of an optical network signal by modulating the laser beam.

The foregoing describes in detail a free-electron laser, a heat dissipating apparatus and a network node using the graphene illuminator provided by the embodiments of the present invention. Specific examples are used in the specification to describe the principles and implementation manners of the present invention. These embodiments only help understand the method and core idea of the present invention. A person of ordinary skill may make various modifications and Fvariations to the invention without departing from the idea of the present invention. Therefore, disclosure of the specification should not be understood as a limitation on the present invention.

What is claimed is:

1. A graphene illuminator, comprising:
 a graphene material forming a plane for providing free electrons;
 two electrodes respectively disposed on two opposite ends or two opposite lateral sides of the graphene material, and both disposed on the plane of the graphene material;
 a power supply having a positive terminal and a negative terminal which are respectively connected to the two electrodes, configured to apply, in a first direction, an accelerating electric field to the graphene material; and magnet sets placed on an upper and a lower sides of the plane, configured to generate a magnetic field, wherein a direction of the magnetic field is perpendicular to the plane and is alternately reversed along the first direction;

wherein under influence of the accelerating electric field and the magnetic field, the free electrons provided by the graphene material perform a curvilinear motion on the plane and are excited to generate photons.

2. The graphene illuminator according to claim 1, wherein the graphene material is a rectangular or strip-shaped graphene sheet, and that the two electrodes are respectively disposed on two opposite ends or two opposite lateral sides of the rectangular graphene sheet, or disposed at two opposite ends of the strip-shaped graphene sheet.

3. The graphene illuminator according to claim 1, wherein the graphene material is a circular or annular graphene sheet, and that the two electrodes are respectively disposed on two opposite ends or two opposite lateral sides of the graphene material such that one electrode is disposed at a center of the circular or annular graphene sheet, and the other electrode is disposed at a periphery or circumference of the circular or annular graphene sheet.

4. The graphene illuminator according to claim 1, wherein the curvilinear motion is a sinusoidal motion.

5. The graphene illuminator according to claim 1, wherein South poles and North poles of the magnet sets are arranged alternately such that the magnet sets comprise first magnet sets and second magnet sets, and the first magnet sets and the second magnet sets are arranged alternately in the direction of the accelerating electric field, wherein the first magnet sets are arranged from the South pole to the North pole along a direction perpendicular to the plane, and an arrangement of the two poles of the second magnet sets are opposite to that of the first magnet sets.

6. The graphene illuminator according to claim 1, further comprising reflecting mirror sets, wherein the reflecting mirror sets comprise a first reflecting mirror set above one electrode and a second reflecting mirror set above the other electrode and opposite to the first reflecting mirror set, wherein a portion of the photons excited by the free electrons are emitted through the first reflecting mirror set, the other part of the photons are reflected back by the first reflecting mirror set, and the second reflecting mirror set reflects back the photons hitting on it towards the first reflecting mirror set, thereby converging the photons excited by the free electrons in a single direction.

7. An optical transmission network node, comprising:
a graphene illuminator and reflecting mirror sets;
wherein the graphene illuminator comprises:
   a graphene material forming a plane for providing free electrons;
   two electrodes respectively disposed on two opposite ends or two opposite lateral sides of the graphene material, and both disposed on the plane of the graphene material;
   a power supply having a positive terminal and a negative terminal which are respectively connected to the two electrodes, configured to apply, in a first direction, an accelerating electric field to the graphene material; and
   magnet sets placed on an upper and a lower sides of the plane, configured to generate a magnetic field, wherein a direction the magnetic field is perpendicular to the plane and is alternately reversed along the first direction;
wherein the reflecting mirror sets comprise a first reflecting mirror set above one electrode and a second reflecting mirror set above the other electrode and opposite to the first reflecting mirror set; and
wherein under influence of the accelerating electric field and the magnetic field, the free electrons provided by the graphene material perform a curvilinear motion on the plane and are excited to generate photons, a portion of the photons excited by the free electrons are emitted through the first reflecting mirror set, the other part of the photons are reflected back by the first reflecting mirror set, and the second reflecting mirror set reflects back the photons hitting on it towards the first reflecting mirror set, thereby converging the photons excited by the free electrons in a single direction.

8. The optical transmission network node according to claim 7, wherein the graphene material is a rectangular or strip-shaped graphene sheet, and the two electrodes are disposed on two opposite lateral sides of the rectangular graphene sheet, or disposed at two opposite ends of the strip-shaped graphene sheet.

9. The optical transmission network node according to claim 7, wherein the graphene material is a circular or annular graphene sheet, and that the two electrodes are respectively disposed on two opposite ends or two opposite lateral sides of the graphene material such that one electrode is disposed at a center of the circular or annular graphene sheet, and the other electrode is disposed at a periphery or circumference of the circular or annular graphene sheet.

\* \* \* \* \*